United States Patent [19]

Hirshfield

[11] Patent Number: 5,581,268
[45] Date of Patent: Dec. 3, 1996

[54] METHOD AND APPARATUS FOR INCREASING ANTENNA EFFICIENCY FOR HAND-HELD MOBILE SATELLITE COMMUNICATIONS TERMINAL

[75] Inventor: Edward Hirshfield, Cupertino, Calif.

[73] Assignee: Globalstar L.P., San Jose, Calif.

[21] Appl. No.: 509,754

[22] Filed: Aug. 3, 1995

[51] Int. Cl.$^6$ ............... H01Q 1/38; H01Q 23/00
[52] U.S. Cl. ............ 343/853; 343/701; 343/895
[58] Field of Search ............. 343/895, 700 MS, 343/737, 701, 853, 893; H01Q 1/36, 1/38, 5/00, 5/02, 23/00

[56] References Cited

U.S. PATENT DOCUMENTS

| | | | |
|---|---|---|---|
| 4,644,360 | 2/1987 | Mead et al. | 343/700 MS |
| 5,073,900 | 12/1991 | Mallinckrodt | 375/1 |
| 5,198,831 | 3/1993 | Burrell et al. | 343/895 |
| 5,233,626 | 8/1993 | Ames | 375/1 |
| 5,303,286 | 4/1994 | Wiedeman | 379/59 |
| 5,339,330 | 8/1994 | Mallinckrodt | 375/1 |
| 5,410,728 | 4/1995 | Bertiger et al. | 455/13.1 |
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | 379/59 |
| 5,477,232 | 12/1995 | Yamamoto | 343/895 |

OTHER PUBLICATIONS

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey$^{SM}$ before the FCC, Washington, D.C. 20554, May 31, 1991 pp. 33–51.

Application of Ellipsat Corporation Ellipsat for the Authority to Construct Ellipso$^R$I An Elliptical Orbit Satellite System, before the FCC, Washington, D.C. 20554, Nov. 2, 1990, pp. 5–34.

Application of Loral Cellular Systems, Corp., Globalstar Mobile Communications Wherever You Are, before the FCC, Washington, D.C. Jun. 3, 1991, pp. 94–187.

*Primary Examiner*—Michael C. Wimer
*Attorney, Agent, or Firm*—Perman & Green

[57] ABSTRACT

An antenna structure (10) that includes a plurality of transmit linear elements (22a–22d) arranged parallel to one another and a plurality of receive linear elements (24a–24d) also arranged parallel to one another. Individual ones of the plurality of transmit linear elements are spaced apart from one another and have one of the plurality of receive linear elements disposed therebetween. A width of each of the plurality of transmit linear elements and the plurality of receive linear elements varies periodically along a length of the linear element, thereby also periodically impedance modulating each element. Furthermore, a narrowest width portion of a transmit linear element is disposed adjacent to a widest width portion of an adjacently disposed receive linear element, and vice versa, thereby minimizing coupling between the elements. The transmit amplifiers (16a, 16b) and the receive amplifiers (30a, 30b) are located at opposite ends of an antenna stalk body (36) such that the transmit amplifiers and receive amplifiers are intimately associated with their respective antenna elements, thereby further minimizing losses. Also, because the transmit amplifiers may generate considerable heat, the construction technique thermally isolates the lower power receive amplifiers from the higher power transmit amplifiers. Also, the transmit amplifiers are preferably located at the end of the antenna stalk that is nearest to the user transceiver, thereby providing improved heat sinking.

19 Claims, 3 Drawing Sheets

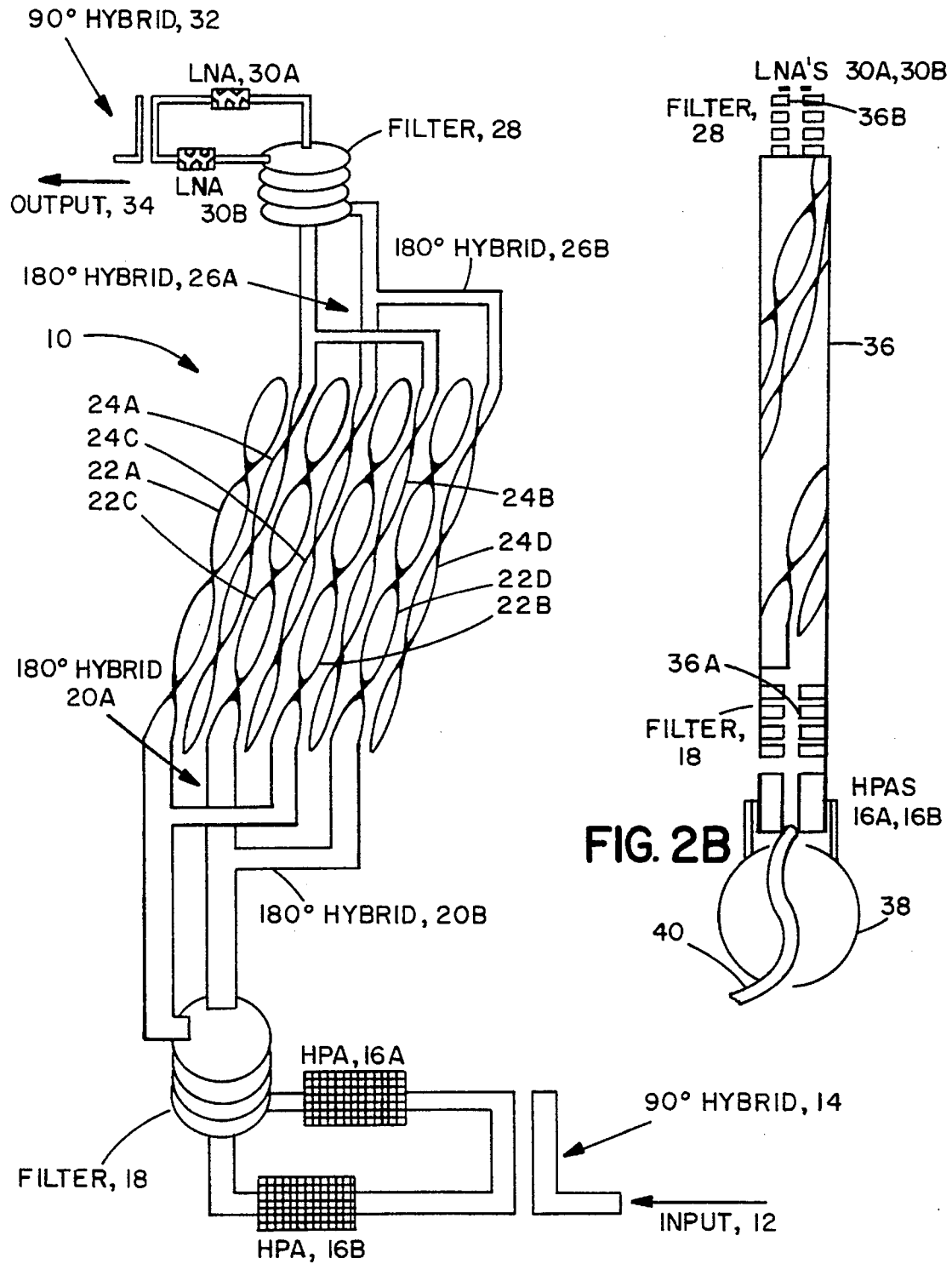

METHOD AND APPARATUS FOR INCREASING ANTENNA EFFICIENCY FOR HAND-HELD MOBILE SATELLITE COMMUNICATIONS TERMINAL

FIELD OF THE INVENTION

This invention relates generally to antennas and, in particular, to four arm helical spiral antennas.

BACKGROUND OF THE INVENTION

One conventional antenna type is known as a four arm helical spiral, wherein transmit and receive antenna elements may be interleaved with one another. This type of antenna provides a generally hemispherical coverage region. As a result, and if such an antenna type were to be employed as an antenna for a user terminal in a satellite communication system, in particular a non-geosynchronous orbit satellite communication system, the gain for low satellite elevation angles is greater than for a satellite that is directly overhead, thus compensating to some degree for the greater path loss to a satellite near the horizon.

However, one disadvantage of conventional four arm helical spiral antennas is that they tend to be physically larger than is customary for hand-held user terminals, such as cellular telephones. A second disadvantage is that loss between the active elements and the antennas tends to be greater than desirable. A further disadvantage is an undesirable loss that can result from mutual coupling between interleaved transmit and receive antenna elements.

OBJECTS OF THE INVENTION

It is a first object of this invention to provide an improved antenna structure that overcomes the foregoing and other disadvantages.

A second object of this invention is to provide a four arm helical spiral antenna structure having a reduced size and a reduced loss, relative to conventional antenna structures.

A third object of this invention is to provide an interleaved helical spiral antenna structure wherein the transmit and receive antenna elements or radiators are width and thus impedance modulated, and wherein the line widths of transmit radiators are aligned with the line widths of adjacent receive radiators so as to minimize coupling therebetween.

A further object of this invention is to provide a helical spiral antenna structure having a construction that provides an optimum placement of radiators, amplifiers, filters, and hybrid couplers, that maximizes thermal and electrical isolation between high power transmit amplifiers and lower power receive amplifiers, and that furthermore places all of these components above a rotary antenna joint, thereby reducing losses.

SUMMARY OF THE INVENTION

The foregoing and other problems are overcome and the objects of the invention are realized by an antenna structure that includes a plurality of transmit linear elements arranged parallel to one another and a plurality of receive linear elements arranged parallel to one another. Individual ones of the plurality of transmit linear elements are spaced apart from one another and have one of the plurality of receive linear elements disposed therebetween. In accordance with this invention a width of each of the plurality of transmit linear elements and the plurality of receive linear elements varies periodically along a length of the linear element, thereby also periodically impedance modulating each element. Furthermore, a narrowest width portion of a transmit linear element is disposed adjacent to a widest width portion of an adjacently disposed receive linear element, and vice versa, thereby minimizing coupling between the elements.

In accordance with a further aspect of this invention the transmit amplifiers and associated components, and the receive amplifiers and associated components, are located at opposite ends of an antenna stalk such that transmit amplifiers and receive amplifiers are intimately associated with their respective antenna elements, thereby further minimizing losses. Also, because the transmit amplifiers may generate considerable heat, the construction technique thermally isolates the lower power receive amplifiers from the higher power transmit amplifiers. Also, the transmit amplifiers are preferably located at the end of the antenna stalk that is nearest to the user transceiver, thereby providing improved heat sinking.

A further aspect of this invention employs active impedance matching between the antenna elements and their respective amplifiers to maximize the coupling of energy from the radiating elements to and from their associated amplifiers. Impedance matching also occurs in bandpass filters which are preferably embodied as multi-disk resonators. Also, the radiating line width is selected to minimize the need for impedance transformation between the amplifiers and free space.

BRIEF DESCRIPTION OF THE DRAWINGS

The above set forth and other features of the invention are made more apparent in the ensuing Detailed Description of the Invention when read in conjunction with the attached Drawings, wherein:

FIG. 2A is a representative diagram of the antenna system of FIG. 1;

FIG. 2B is a simplified illustration of a user terminal antenna structure in accordance with this invention;

DETAILED DESCRIPTION OF THE INVENTION

Reference is made to FIGS. 1, 2A, 2B and 3 for the ensuing description of a presently preferred embodiment of this invention.

Figure 1:
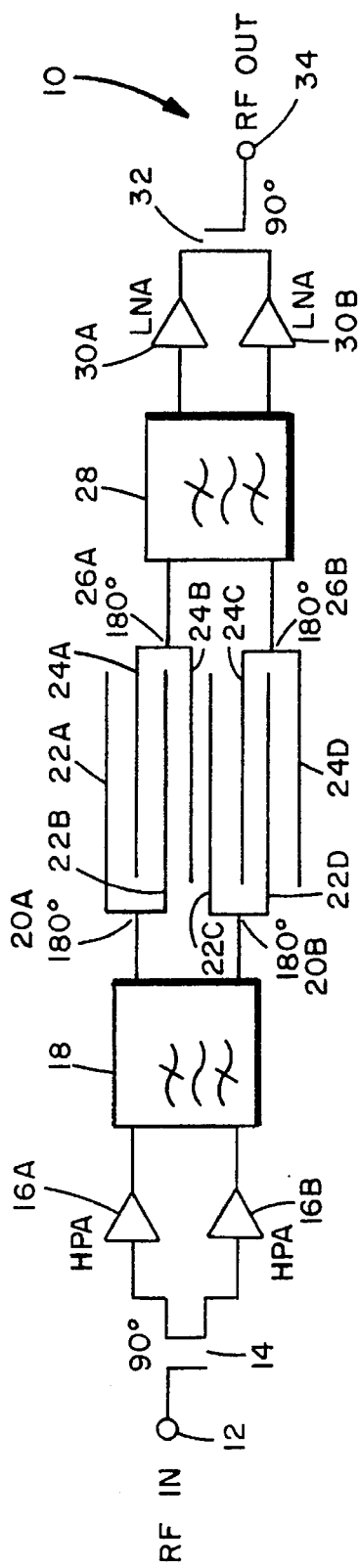
FIG. 1 is a block diagram of an antenna system in accordance with this invention.

In FIG. 1 an RF input signal is applied to an input node 12 of an antenna system 10. The input node 12 is connected to a 90° hybrid 14 which provides a first input to a first high power amplifier (HPA) 16a and a quadrature input to a second HPA 16b. The HPA 16a and 16b are power amplifiers suitable for amplifying the RF input signal to a level sufficient for driving the transmit antenna. In a preferred embodiment of this invention the HPAs 16a and 16b are embodied within monolithic microwave integrated circuits (MMICs) of small size. The outputs of the HPAs 16a and 16b (offset by 90° from one another) are applied to a bandpass filter 18 and thence to 180° hybrids 20a and 20b. The hybrids 20a and 20b have outputs (offset by 180° from one another) connected to individual ones of the four arms or radiators, also referred to herein as elements 22a–22d, of the transmit antenna. Due the operation of the hybrids 14, 20a and 20b the RF signals in each arm are offset by 90° from one another (i.e., in quadrature).

Figure 3:
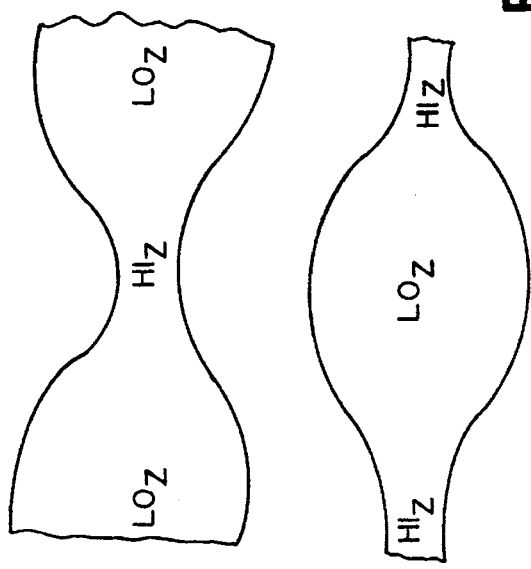
FIG. 3 shows an enlarged portion of the interleaved transmit and receive antenna elements of FIGS. 2A and 2B and illustrates the width modulation, and consequent impedance modulation, in accordance with an aspect of this invention.

The receiving portion of the antenna 10 includes a four arm receive antenna having elements 24a–24d which are interleaved with the transmit elements 22a–22d as shown most clearly in FIG. 2A. The interleaved transmit and receive elements are spiral wound about a dielectric circular cylindrical form or tube 36 which forms the body of the antenna 10 (FIG. 2B). The transmit and receive elements are also width modulated as shown in FIG. 3 so as to reduce losses due to mutual coupling. This aspect of the invention is described in further detail below.

Continuing with the description of the block diagram in FIG. 1, the quadrature outputs of the receive elements 24a–24d are coupled via 180° hybrids 26a and 26b to a bandpass filter 28. The output of the bandpass filter 28 feeds the inputs of a first low noise amplifier (LNA) 30a and a second LNA 30b. The LNAs 30a and 30b are also preferably embodied within MMICs. The outputs of the LNAs 30a and 30b are coupled, via a 90° hybrid 32, to an RF output node 34.

Figure 4:
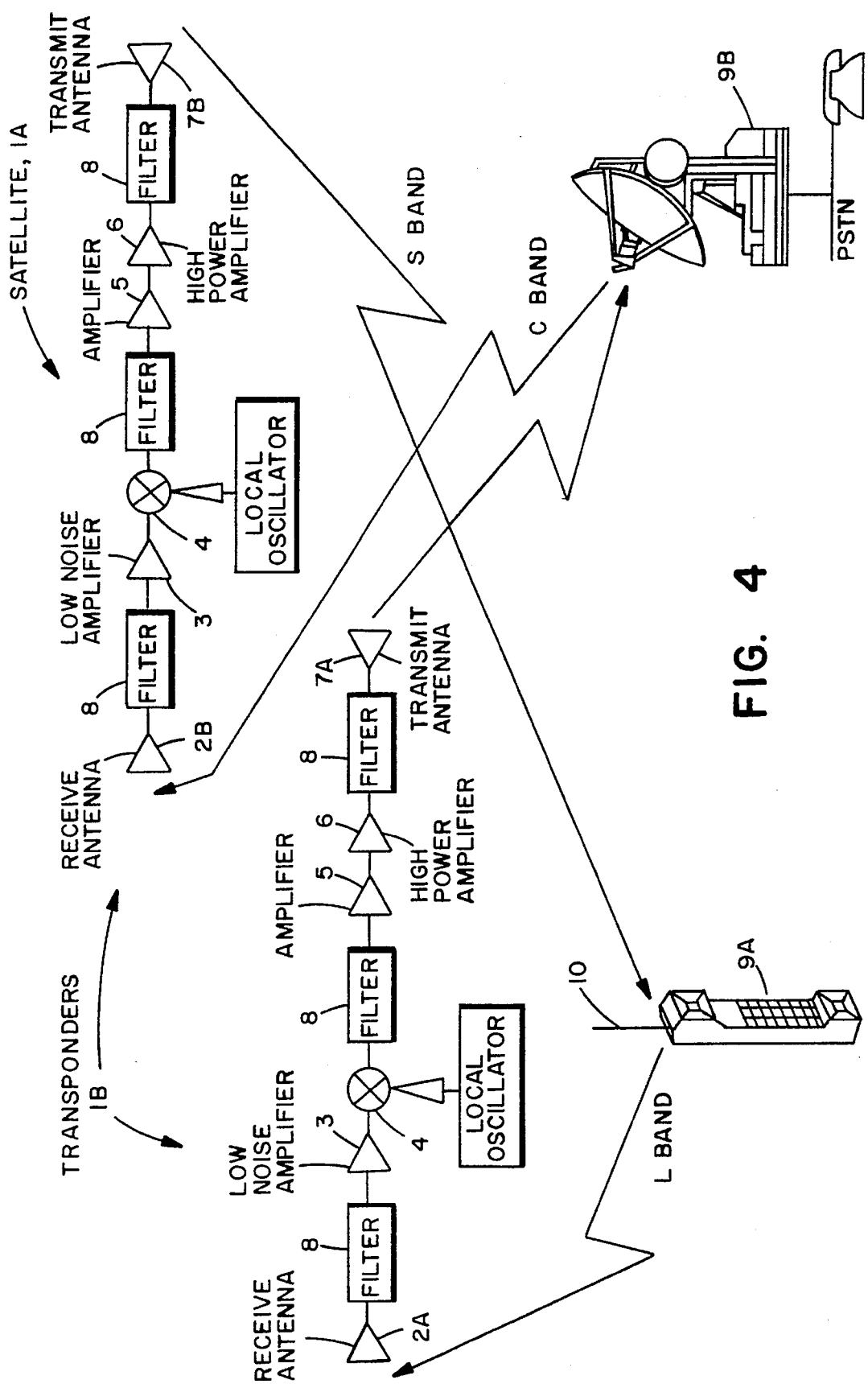
FIG. 4 is a block diagram of a satellite communication system of a type within which the antenna system of this invention finds utility.

In a presently preferred embodiment of the invention the antenna system 10 of FIG. 1 forms a portion of a hand held user terminal 9a as depicted in FIG. 4. As such, it should be realized that the RF input signal that is applied to the input node 12 is derived at least in part from a user's voice input signal. In like manner, the RF output signal from the node 34 is applied to mixers and a demodulator for extracting signalling information and for also deriving an audio signal for the user. The various circuits within the hand held user terminal 9a that perform these functions are not germane to an understanding of this invention and are not described in further detail. It should be realized that the hand held user terminal 9a is but one suitable application for the antenna 10 of this invention, and is not to be construed in a limiting sense upon the application of, and uses for, the antenna 10 of this invention.

As shown in FIG. 3, the antenna elements are width modulated along substantially their entire length. For those regions where the width is the widest the impedance is the lowest, while conversely where the width is the narrowest the impedance is the highest. The elements are thus width modulated to periodically transform their impedance. When the elements are at higher impedance (narrower) the voltage is higher, and when the elements are wider, the impedance is lower and the voltage is also lower. By aligning the element widths on the transmit radiators 22a–22d to be wide adjacent to the element widths on the receive radiators 24a–24d which are narrow the coupling is minimized.

Also, in a preferred embodiment of this invention pairs of radiators are formed as electrically conductive layers on opposite sides of a flexible printed circuit board which forms the dielectric circular cylindrical form or tube 36 of FIG. 2B. This tends to further reduce coupling, while facilitating the interconnections as shown. Alternate radiators are connected by the 180° hybrids 20a, 20b, 26a, 26b which are coupled, preferably, to disc-type resonators which form the filters 18 and 28 in quadrature, thereby providing the desired circular polarizations.

To reiterate, and as is illustrated most clearly in FIGS. 2A and 3, the transmit and receive antenna radiators or elements 22a–22d and 24a–24d, respectively, are interleaved with one another and are offset such that the high impedance portion of a transmit element is adjacent to the low impedance portion of receive element, and vice versa.

A first aspect of this invention thus inter-weaves transmit and receive antennas, and also shapes the radiating lines to minimize losses due to mutual coupling, while also shortening the length required for efficient reception.

In a presently preferred embodiment of this invention, wherein the transmit frequencies are in the L-band and the receive frequencies are in the S-band, the elements are width modulated so as to provide an approximately 10 ohm minimum impedance and a maximum impedance in the range of approximately 200 ohms to approximately 300 ohms. The number of periods of width modulation is at least one, while a preferred number is a function of length (e.g., eight to ten inches). A most desired period is sized to one-half wavelength so that in an established standing wave the current maximum is achieved where the impedance is lowest and the voltage maximum is achieved where the impedance is highest. However, in the general case the transmit and receive frequencies are different and thus have different wavelengths. As such, it can be realized that some compromise may be necessary in order to adjust the antenna modulation period as a function of the difference between the transmit and receive wavelengths.

A second aspect of this invention, shown in FIG. 2B, feeds the transmit antenna and the receive antenna from opposite ends of the antenna stalk so that the transmit HPAs 16a and 16b, and the receive LNAs 30a and 30b, are intimately associated with their respective antenna elements, thereby further minimizing losses. Also, because the HPAs 16a and 16b may generate considerable heat, the construction technique illustrated in FIG. 2B thermally isolates the LNAs 30a and 30b from the HPAs 16a and 16b.

A further aspect of this invention employs active impedance matching between the antenna elements and their respective amplifiers to maximize the coupling of energy from the radiating elements to and from their associated amplifiers. Impedance matching also occurs in the filters 18 and 28. Also, the radiating line width is selected to minimize the need for impedance transformation between the amplifiers and free space.

For example, power FETs (a component of the transmitter HPAs 16a and 16b) have a characteristically low output impedance. As a result, line widths connected to the outputs of the HPAs 16a and 16b are preferably made wide (for example, 10 ohms or less). Conversely, the input impedance of the LNAs 30a and 30b is characteristically high. As a result, the width of the lines connected to the inputs of LNAs 30a and 30b is made narrower (for example, up to 200 ohms) at the input junction point.

As is best seen in FIGS. 2A and 2B, two four arm helical spirals are formed by wrapping the width modulated lines around the low loss dielectric tube 36. The tube 36 is preferably formed from a flexible printed circuit board substrate on which the antenna element conductors are disposed, and which also mounts certain other of the components, such as the hybrids 20a, 20b, 26a and 26b. A suitable thickness for the wall of the tube 36 is 0.0625", and a suitable diameter is 0.6". In the example described herein, the transmit frequency (L-band) is lower than the receive frequency (S-band) and the transmit elements 22a–22d are therefore physically larger than the receive elements 24a–24d.

The HPAs 16a and 16b are located at the base of the tube 36 which is adjacent to the body of the hand-held user terminal 9a (FIG. 4). This arrangement provides the thermal mass and radiator surface required to dissipate heat generated by the HPAs 16a and 16b.

The LNAs 30a and 30b are located at the top of the tube 36, and are thus thermally isolated from the HPAs 16a and 16b. Both the HPAs and the LNAs are preferably embodied within MMICs, and as a result have a very small size, thereby facilitating their incorporation within the antenna stalk itself.

It should further be noted that the HPAs, LNAs, filters and hybrids of the antenna system 10 are preferably all located above a conventional rotary joint 38 that connects the antenna stalk to the user terminal 9a. As a result, it is not necessary to feed the HPA-amplified RF signals through the rotary joint 38, nor is it necessary to feed a received but unamplified signal through the joint. Placing all major components of the antenna system 10 above the rotary joint 38, within the antenna stalk itself, thus improves the overall operation of the user terminal and significantly reduces losses.

The two LNAs 30a, 30b and the two HPAs 16a, 16b are used to both couple and to provide a low loss active match to the antenna impedances. The impedance of the 180° hybrid 18 is preferably selected to match to the output impedance of the HPAs 16a and 16b and the antenna radiator impedance.

A cable 40 is used to bring the output from the LNAs 30a, 30b to the receiver electronics and to provide bias potentials to the LNAs. The cables 40 also brings the transmitter signal to the HPAs for final amplification and the received signals to subsequent receiver stages. The cable passes through apertures 36a and 36b in the center of the disc resonators forming the filters 18 and 28. The center of the disc resonators have no field and, as a result, the proximity of the cable 40 does not significantly affect their microwave performance.

Having described in detail the presently preferred embodiment of this invention, reference is now made to FIG. 4 for illustrating a block diagram of a satellite communications system of a type to which the antenna 10 of this invention can be applied. In the satellite communications system a constellation of low earth orbit satellites 1a enables users to make phone calls anywhere in the world.

More particularly, FIG. 4 illustrates a satellite transponder 1b configured for full duplex communication. The communications payload includes one or more such transponders having a plurality of antennas 2 to receive signals from the earth's surface, low noise amplifiers 3, frequency shifters or converters 4 comprised of a local oscillator and a mixer, followed by amplifiers 5, high power amplifiers 6 and transmitting antennas 7. Filters 8 are also included to pass desired in-band signals and reject unwanted out-of-band noise signals. One transponder receives signals from the antenna 10 of a user terminal 9a, frequency shifts the received user signals, and transmits the frequency shifted signals to a ground station, such as a gateway 9b that is connected to the public switched telephone network (PSTN). A second transponder receives signals from one or more of the gateways 9b, frequency shifts the received signals, and transmits the frequency shifted signals to the antenna 10 of the user terminal 9b. In this manner a full duplex communication path (voice and/or data) can be established between user terminals 9a and terminals connected to the PSTN.

In a presently preferred embodiment of this invention the user terminals 9a (fixed or mobile) are capable of operating in a full duplex mode and communicate via, by example, L-band RF links (uplink) and S-band RF links (downlink) through the return and forward satellite transponders, respectively. Uplink L-band RF links may operate within a frequency range of 1.61 GHz to 1.626 GHz, bandwidth 16.5 MHz, and are preferably modulated with voice signals and/or digital signals in accordance with a spread spectrum technique. Downlink S-band RF links may operate within a frequency range of 2.4835 GHz to 2.5 GHz, bandwidth 16.5 MHz. The gateway 9b may communicate with the satellite 1a via receive antenna 2b and transmit antenna 7a with, by example, a full duplex C-band RF link that may operate within a range of frequencies centered on 5 GHz. The C-band RF links bi-directionally convey communication feeder links, and also convey satellite commands (forward link) and receive telemetry information (return link). The L-band and the S-band satellite antennas 2a and 7b, respectively, are multiple beam (preferably 16 beam) antennas that provide earth coverage within an associated service region. Two or more satellites 1a may each convey the same communication between a given user terminal 9a and one of the gateways 9b by the use of spread spectrum techniques. This mode of operation thus provides for diversity combining at the respective receivers, leading to an increased resistance to fading and facilitating the implementation of a soft handoff procedure.

It is pointed out that all of the frequencies, bandwidths and the like that are described above are representative of but one particular system. Other frequencies and bands of frequencies may be used with no change in the principles being discussed. Furthermore, the various antenna-related dimensions, numbers of elements, couplers, filters and amplifiers, radiator impedances and the like that have been described above are illustrative, and are not to be construed in a limiting sense upon the practice of this invention.

Thus, while the invention has been particularly shown and described with respect to preferred embodiments thereof, it will be understood by those skilled in the art that changes in form and details may be made therein without departing from the scope and spirit of the invention.

What is claimed is:

1. An antenna structure, comprising:

a plurality of transmit linear elements arranged parallel to one another;

a plurality of receive linear elements arranged parallel to one another; and individual ones of said plurality of transmit linear elements are spaced apart from one another and have one of said plurality of receive linear elements disposed therebetween; wherein a width of each of said plurality of transmit linear elements varies periodically along a length of the transmit linear element and a width of each of said plurality of receive linear elements varies periodically along a length of the receive linear element, and wherein, for a given one of the plurality of transmit linear elements, a narrowest width portion of the transmit linear element is disposed next to a widest width portion of an adjacently disposed receive linear element and a widest width portion of the transmit linear element is disposed next to a narrowest width portion of the adjacently disposed receive linear element.

2. An antenna structure as set forth in claim 1, wherein said plurality of transmit linear elements and said plurality of receive linear elements are disposed about an elongated dielectric support member.

3. An antenna structure as set forth in claim 2, and further comprising:
   at least one transmit amplifier having an output coupled to said plurality of transmit linear elements;
   at least one receive amplifier having an input coupled to said plurality of receive linear elements; wherein
   said at least one transmit amplifier is disposed adjacent to a first end of said support member and said at least one receive amplifier is disposed adjacent to a second, opposite end of said support member.

4. An antenna structure as set forth in claim 3, and further comprising means for coupling said first end of said support member to a transceiver unit.

5. An antenna structure as set forth in claim 3, and further comprising:
   a first filter interposed between said output of said at least one transmit amplifier and said plurality of transmit linear elements; and
   a second filter interposed between said input of said at least one receive amplifier and said plurality of receive linear elements.

6. An antenna structure as set forth in claim 5, wherein said first and second filters are each comprised of a multi-disk resonator structure having a centrally disposed aperture, and further comprising an electrical conductor that passes through the apertures for coupling to an output of said at least one receive amplifier.

7. An antenna structure as set forth in claim 3, and further comprising:
   a first filter coupled to said output of said at least one transmit amplifier;
   a first hybrid coupler interposed between an output of said first filter and said plurality of transmit linear elements;
   a second hybrid coupler coupled to said plurality of receive linear elements; and
   a second filter interposed between an output of said second hybrid coupler and said input of said at least one receive amplifier.

8. An antenna structure as set forth in claim 7, wherein there are two transmit amplifiers, two receive amplifiers, wherein there are four of said plurality of transmit linear elements and four of said plurality of receive linear elements, wherein there are two of said first hybrid couplers and two of said second hybrid couplers, each of said hybrid couplers being a 180° hybrid coupler that is coupled to two linear elements, and further comprising:
   a first 90° coupler having an input for receiving an RF signal to be amplified and an output for driving said two transmit amplifiers; and
   a second 90° coupler having inputs for receiving an amplified RF signal from each of said two receive amplifiers and an output providing a received signal.

9. An antenna coupled to a user terminal in a satellite communication system, the satellite communication system comprising:
   at least one communication satellite;
   at least one ground station comprising a transceiver for transmitting and receiving communication signals with said at least one communication satellite; and
   at least one user terminal comprising a transceiver for transmitting and receiving communication signals with said at least one communication satellite; wherein
   said user terminal is further comprised of said antenna, said antenna being bidirectionally coupled to said transceiver and comprised of a spiral wound four arm interleaved structure having a plurality of transmit elements and a plurality of receive elements, each of said plurality of transmit elements being impedance modulated between a maximum impedance and a minimum impedance in a periodic manner along a length of said transmit element and each of said plurality of receive elements being impedance modulated between a maximum impedance and a minimum impedance in a periodic manner along a length of said receive element, and wherein a region of maximum impedance of a given one of said transmit elements is disposed next to a region of minimum impedance of an adjacently disposed receive element and a region of minimum impedance of said transmit element is disposed next to a region of maximum impedance of said adjacently disposed receive element.

10. An antenna as set forth in claim 9, wherein said antenna is further comprised of:
   at least one transmit amplifier having an output coupled to said plurality of transmit elements;
   at least one receive amplifier having an input coupled to said plurality of receive elements; wherein
   said at least one transmit amplifier is disposed adjacent to a first end of said antenna that is closest to said user terminal and said at least one receive amplifier is disposed adjacent to a second, opposite end of said antenna that is furthest from said user terminal.

11. An antenna as set forth in claim 10, wherein said antenna is further comprised of:
   a first filter interposed between said output of said at least one transmit amplifier and said plurality of transmit elements; and
   a second filter interposed between said input of said at least one receive amplifier and said plurality of receive elements, wherein said first and second filters are each comprised of a multi-disk resonator structure having a centrally disposed aperture, and further comprising an electrical conductor that passes through the apertures for coupling an output of said at least one receive amplifier to said transceiver.

12. An antenna as set forth in claim 10, wherein said antenna is further comprised of:
   a first filter coupled to said output of said at least one transmit amplifier;
   a first hybrid coupler interposed between an output of said first filter and said plurality of transmit elements;
   a second hybrid coupler coupled to said plurality of receive elements; and
   a second filter interposed between an output of said second hybrid coupler and said input of said at least one receive amplifier.

13. An antenna as set forth in claim 12, wherein there are two transmit amplifiers, two receive amplifiers, wherein there are four of said plurality of transmit elements and four of said plurality of receive elements, wherein there are two of said first hybrid couplers and two of said second hybrid couplers, each of said hybrid couplers being a 180° hybrid coupler that is coupled to two elements, and further comprising:
   a first 90° coupler having an input for receiving an RF signal to be amplified from said transceiver and an output for driving said two transmit amplifiers; and
   a second 90° coupler having inputs for receiving an amplified RF signal from each of said two receive amplifiers and an output providing a received signal to said transceiver.

14. An antenna as set forth in claim 9, wherein in said satellite communication system there are a plurality of communication satellites in low earth orbit, and wherein communications are bidirectionally transmitted as spread spectrum, code division multiple access communication signals between a user terminal's transceiver and the ground station's transceiver, through said antenna and through at least one of said plurality of communication satellites.

15. An antenna as set forth in claim 9, wherein said antenna transmits RF signals to said at least one communication satellite using frequencies in the L-band, and wherein said antenna receives RF signals from said at least one communication satellite using frequencies in the S-band.

16. A terminal for use in a satellite communication system of a type wherein communication satellites rise above the horizon and set below the horizon relative to a location of the terminal, comprising:

a transceiver for transmitting and receiving communication signals with at least one communication satellite; and an antenna that is bidirectionally coupled to said transceiver, said antenna being comprised of a spiral wound interleaved structure having a plurality of transmit elements and a plurality of receive elements, each of said plurality of transmit elements being impedance modulated between a maximum impedance and a minimum impedance in a periodic manner along a length of said transmit element and each of said plurality of receive elements being impedance modulated between a maximum impedance and a minimum impedance in a periodic manner along a length of said receive element, and wherein a region of maximum impedance of a given one of said transmit elements is disposed next to a region of minimum impedance of an adjacently disposed receive element and a region of minimum impedance of said transmit element is disposed next to a region of maximum impedance of said adjacently disposed receive element.

17. A terminal as set forth in claim 16, wherein said transmit and receive elements are formed as electrically conductive linear elements upon a dielectric substrate and are impedance modulated in a periodic manner by a periodic variation in a width of said transmit and receive elements, and wherein a region of maximum width of a given one of said transmit elements is disposed next to a region of minimum width of an adjacently disposed receive element and a region of minimum width of said transmit element is disposed next to a region of maximum width of said adjacently disposed receive element.

18. A terminal as set forth in claim 16, and further comprising at least one transmit amplifier having an output coupled to said plurality of transmit elements; at least one receive amplifier having an input coupled to said plurality of receive elements; wherein said at least one transmit amplifier is disposed adjacent to a first end of said antenna that is closest to said user terminal and said at least one receive amplifier is disposed adjacent to a second, opposite end of said antenna that is furthest from said user terminal.

19. An terminal as set forth in claim 16, wherein said antenna transmits and receives RF signals conveying spread spectrum, code division multiple access communication signals between said terminal and said at least one communication satellite.

\* \* \* \* \*

UNITED STATES PATENT AND TRADEMARK OFFICE
CERTIFICATE OF CORRECTION

PATENT NO. : 5,581,268

DATED : 12/3/96

INVENTOR(S) : Hirshfield

It is certified that error appears in the above-identified patent and that said Letters Patent is hereby corrected as shown below:

IN THE CLAIMS:

In column 8, line 66, the word "inputs" should be replaced with --an input--.

Signed and Sealed this

Eighth Day of April, 1997

Attest:

BRUCE LEHMAN

Attesting Officer

Commissioner of Patents and Trademarks